United States Patent
Fredericks

[15] 3,688,812
[45] Sept. 5, 1972

[54] METHOD FOR SEALING AMPOULES

[72] Inventor: Alan D. Fredericks, College Station, Tex.

[73] Assignee: Oceanography International Corporation

[22] Filed: Feb. 17, 1971

[21] Appl. No.: 116,083

[52] U.S. Cl. ............................141/4, 53/39, 65/34, 65/270, 141/64
[51] Int. Cl. .........C03b 23/18, B67b 5/00, B65b 7/90
[58] Field of Search ........65/34, 270, 23; 53/39, 329, 53/285; 141/64, 31, 4

[56] References Cited

UNITED STATES PATENTS

| | | |
|---|---|---|
| 1,922,458 | 8/1933 | Schaeffer.....................141/31 |
| 3,012,386 | 12/1961 | Pechmann et al. ..........53/285 |
| 2,729,381 | 1/1956 | Wiser et al....................141/64 |

Primary Examiner—S. Leon Bashore
Assistant Examiner—Kenneth Schor
Attorney—Richards, Harris & Hubbard

[57] ABSTRACT

An improvement in the method of sealing glass ampoules by melting the neck of the ampoule in the presence of an open flame to create a closure. The improvement involves supporting an elongated purge cone upon the neck of the ampoule so that the tapered end of the cone extends into the neck of the ampoule. A conduit is introduced through the purge cone to extend downwardly into the neck of the ampoule. The bottom of the conduit is located below the bottom of the purge cone but above the point in the ampoule neck at which the closure is to be made. Gas is circulated through the conduit and exhausted upwardly through the purge cone and through any gaps between the tapered portion of the purge cone and the neck of the ampoule to prevent inflow of contaminants from the flame used to seal the ampoule.

2 Claims, 4 Drawing Figures

PATENTED SEP 5 1972   3,688,812

INVENTOR:
ALAN D. FREDERICKS

ATTORNEYS

METHOD FOR SEALING AMPOULES

BACKGROUND OF THE INVENTION

1. Field of the Invention

This invention relates to sealing of glass containers, more particularly to the sealing of a glass container while preventing the inflow of contaminants from the surrounding environment into the container.

2. Description of Prior Art

In some chemical analytical techniques it is desirable to charge an ampoule with a particular liquid. The ampoule is then flushed to remove any undesirable gaseous or readily volatile liquid components with a purging gas and then sealed to permit subsequent treatment of the liquid within the ampoule as by heating to cause a reaction between the liquid components. Following heating and chemical reaction of the components the ampoule may be broken and the contents thereof analyzed to determine qualitatively or quantitatively the presence of desired components.

For example, in determining the dissolved organic carbon content of water, it is common to place the sample to be analyzed into an ampoule together with quantities of potassium persulfate and dilute phosphoric acid solution. As only the organic carbon content of the water is to be analyzed, the inorganic carbon components have to be flushed from the ampoule following charging of the water and chemical reagents to the ampoule. Flushing may be accomplished by passing a conduit into the liquid through the mouth of the ampoule and circulating a gas, such as purified oxygen through the liquid to purge the inorganic carbon compounds, such as carbon dioxide, from the liquid. After sufficient oxygen has been circulated through the liquid to discharge the inorganic carbon compounds the ampoule is sealed by passing a gas flame in proximity to the neck of the ampoule to melt the glass. As the glass reaches the molten state, the ampoule is rotated to create a closure in the neck of the ampoule. The ampoule may then be placed in a furnace where the persulfate and phosphoric acid will, at an elevated temperature, oxidize the organic carbon compounds present in the water to create carbon dioxide. The carbon dioxide may then be analyzed by breaking the ampoule and entraining the carbon dioxide in a carrier gas for passage through a suitable analyzing instrument, such as an infrared analyzer.

Since the flame which is used to seal the neck of the ampoule will generate carbon dioxide, a precaution must be taken to prevent the inflow of the carbon dioxide generated by the flame into the ampoule where it will contaminate the sample.

As the volume of gas used to purge the liquid in the ampoule is normally small, the velocities of gas exiting through the neck of the ampoule to the atmosphere after passage through the liquid will normally be low rendering it possible for carbon dioxide generated by the gas flame to enter into the ampoule. One technique suggested for preventing entrance of the carbon dioxide contaminant involves the use of an elongate tube having a tapered end which is inserted into one end of a rubber sleeve. The other end of the rubber sleeve is inserted over the neck of the ampoule. The conduit used to introduce the purging gas into the liquid is then inserted through the elongated tapered member, through the rubber sleeve and down into the neck of the ampoule to exhaust the purging gas into the liquid. Contamination can still occur, however, as particles of rubber may dislodge from the rubber sleeve upon placing the sleeve over the neck of the ampoule. Dislodged particles can fall into the sample where they will be digested during the oxidizing step causing erroneous readings in the instruments used to analyze the organic carbon content of the liquid. Further, the heat generated by the gas flame can cause "outgassing" of the rubber or if improperly handled can cause some burning of the rubber in both of which instances contamination of the sample can occur.

SUMMARY OF THE INVENTION

The present invention is an improvement in the method of sealing glass ampoules having an elongated neck by applying an open flame to the neck of the ampoule to melt the glass and create a closure. The method is characterized by supporting an elongated purge cone upon the top of the neck of the ampoule with the tapered portion of the cone extending into the neck, the cone having a central opening therethrough. A conduit is then positioned through the purge cone so that the bottom of the conduit terminates below the bottom of the purge cone and above the point at which the closure in the neck is to be made. A gas is then circulated through the conduit for exhaustion through the purge cone to prevent inflow of contaminants during sealing of the ampoule.

DESCRIPTION OF THE PREFERRED EMBODIMENT

Figure 1:
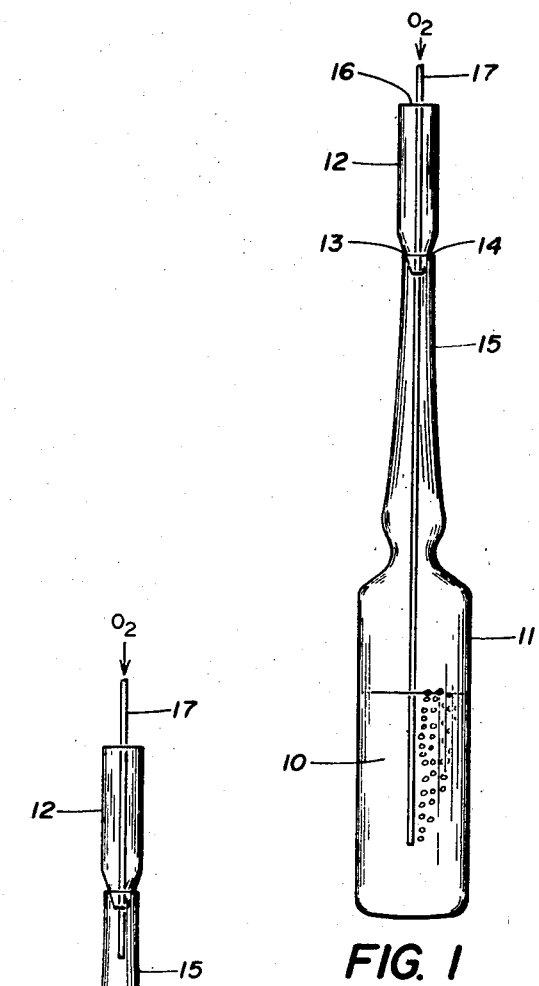
FIG. 1 is an elevational view of an ampoule during purging of unwanted contaminants from a liquid.

With reference to FIG. 1, a liquid 10 which may comprise sea water, the organic carbon content of which is to be analyzed, and chemicals to be utilized for oxidizing the organic carbon compounds in the sea water, such as potassium persulfate and dilute phosphoric acid, are placed in an ampoule 11. As only the organic carbon is to be analyzed, any inorganic carbon compounds, such as carbon dioxide, are flushed from the ampoule 11 by supporting an elongated purge cone 12 upon the top 14 of neck 15 of the ampoule 11. The tapered portion 13 of cone 12 engages the top 14 to provide support to cone 12 and effect a fairly effective seal therewith. Purge cone 12 has a central opening 16 through which a purging conduit 17 of smaller diameter may be inserted. The bottom tip 18 of conduit 17 will be placed below the surface of the liquid 10 so that a purging gas, such as oxygen may be introduced through conduit 17 into the liquid 10 to carry any inorganic carbon compounds upwardly through the neck 15 of ampoule 11. The oxygen and other gases will pass through the opening 16 in purge cone 12 into the atmosphere. In the event that the tapered portion 13 of purge cone 12 does not exactly conform to the top 14 of neck 15, gas may also flow between tapered portion 13 and top 14.

Figure 2:
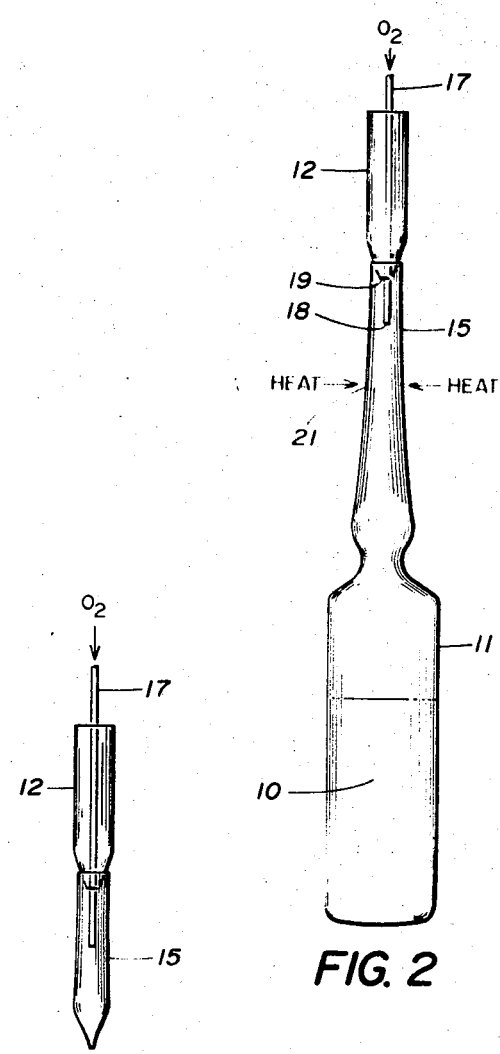
FIG. 2 is an elevational view of the ampoule illustrated in FIG. 1 with the purging tube in the position which it will occupy prior to sealing of the ampoule.

After the passage of a sufficient quantity of oxygen through the liquid 10 to purge the liquid of inorganic carbon compounds, the purging conduit 17 is lifted upwardly to the position illustrated in FIG. 2 at which point the bottom tip 18 of the conduit 17 is below the tip 19 of purge cone 12 and above the point 21 of neck 15 at which the closure is to be made.

Figure 3:
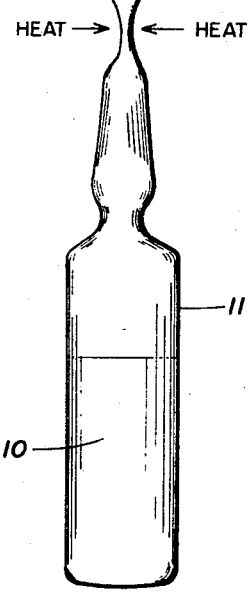
FIG. 3 is an elevational view of the ampoule in FIGS. 1 and 2 with the neck of the ampoule in a molten state.

The ampoule 11 is closed by positioning a source of heat such as a propane-oxygen gas flame in proximity to point 21 to melt neck 15 at that point as is illustrated in FIG. 3. During the melting of neck 15 oxygen is continually circulated through conduit 17 for exhaustion upwardly through purge cone 12 and through any spaces between tapered portion 13 of purge cone 12 and top 14 of neck 15. While the volume of oxygen circulated through conduit 17 may be small, the velocity of the gas passing upwardly around the outside of conduit 17 through tip 18 will be high as the clearance between the outer diameter of conduit 17 and the inner diameter of tip 19 is small, as will be any gaps between the tapered portion 13 of purge cone 12 and the top 14 of neck 15.

Figure 4:
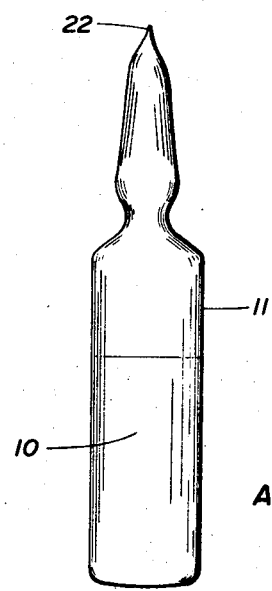
FIG. 4 is an elevational view of the ampoule in FIGS. 1-3 after completion of the sealing of the ampoule.

Thus, inflow of carbon dioxide, carbon monoxide and other gaseous carbon compounds generated by the combustion of the oxygen and propane flame will be prevented from entering into the neck 15 of the ampoule 11. Once the portion of neck 15 at point 21 has been rendered to a molten state, the bottom of ampoule 11 may be rotated and pulled slightly downwardly to form a closed tip 22 as illustrated in FIG. 4. The sealed ampoule unit, generally indicated by the reference numeral 11', may then be transported to a furnace or the like for oxidation of the organic carbon compounds in the liquid 10 by the potassium persulfate and the dilute phosphoric acid solution in a manner well known to those skilled in the art.

By employing the purging technique described above during the sealing of the ampoule 11, contamination from carbon dioxide and carbon monoxide generated by the gas flame used to seal the ampoule is greatly minimized, as the oxygen circulated through conduit 17 will, due to being exhausted at relatively high velocities, prevent inflow of contaminating carbon compounds from the gas flame. Further, as no rubber or other carbon-containing substances are placed in proximity to the ampoule during the sealing operation, there will be no contamination from these substances.

What is claimed is:

1. An improvement in the method of sealing a glass ampoule having an elongate neck by applying an open flame to the neck of said ampoule to melt said glass and create a closure, which improvement comprises:
   supporting an elongated purge cone upon the top of the neck of the ampoule, said cone having a central opening therethrough at least a portion of which is smaller in diameter than the inner diameter of the neck of the ampoule;
   positioning a conduit through said purge cone so that the bottom of said conduit terminates below the bottom of the purge cone and above the point at which the closure in the neck is to be made; and
   circulating a gas through said conduit for exhaustion through said purge cone to prevent inflow of contaminants during the sealing of the ampoule.

2. The method of claim 1, wherein the bottom portion of said purge cone is tapered inwardly and the tapered portion of the cone rests upon the top of the ampoule neck.

* * * * *